United States Patent [19]
Simon et al.

[11] Patent Number: 5,227,609
[45] Date of Patent: Jul. 13, 1993

[54] METHOD AND APPARATUS FOR WELDING

[76] Inventors: Warner H. Simon, 6511 Comanche Ave., Canoga Park, Calif. 91306-4203; Mark J. Simon, 20424 Septo St., Chatsworth, Calif. 91311

[21] Appl. No.: 796,428

[22] Filed: Nov. 22, 1991

[51] Int. Cl.⁵ .............................................. B23K 9/00
[52] U.S. Cl. .................................. 219/137 R; 219/75
[58] Field of Search ............ 219/137 R, 137 WM, 74, 219/124.33, 75

[56] References Cited

U.S. PATENT DOCUMENTS 2,868,954  1/1959  Skinner et al. .................. 219/137 R
4,213,025  7/1980  Kuhnen ........................ 219/124.33
4,645,903  2/1987  De Vito et al. .................... 219/74

FOREIGN PATENT DOCUMENTS 52-45553  4/1977  Japan .............................. 219/137 R
58-159981  9/1983  Japan .............................. 219/137 R Primary Examiner—Clifford C. Shaw
Attorney, Agent, or Firm—Robert M. Sperry

[57] ABSTRACT

An improved method and apparatus for welding heavy gages of high strength steels and alloys relatively quickly and inexpensively, while producing joints which are extremely strong and durable and have high fracture toughness.

19 Claims, 2 Drawing Sheets

METHOD AND APPARATUS FOR WELDING

BACKGROUND

1. Field of Invention

This invention relates to methods and apparatus for welding and is particularly directed to improved methods and apparatus for welding high strength steels and the like.

2. Prior Art

Welding has long been a preferred method for joining metal pieces because the resulting bond is often stronger than the surrounding material and, hence, produces a reliable and long lasting joint. However, progress in science and industry constantly demands new metals which will be stronger and more durable and which will withstand increasingly more hostile environments. At the same time, the metallurgical scientists continue to produce such new metals and new technologies for welding these new metals. One example of the challenges of science and industry is the recent efforts of the world's navies to build submarines which can withstand the severe pressure of submerging deeper than any previous submarines and which can survive impact loading, such as depth charge attacks, icebergs, torpedoes, reefs collisions, etc. at these extreme depths and pressures.

As is well known, welded joints are designed primarily on the basis of the mechanical properties and safety required of the weldment under the service conditions to be imposed on it and the manner in which the service stresses will be applied must always be considered. Also, regardless of their service requirements, the joints must be designed for economy of fabrication. The most widely used method of welding such structures is gas metal arc welding (GMAW). This is an electric arc welding process which produces coalescence of metals by heating them with an arc established between a continuous filler metal (consumable) electrode and the work. In Europe, gas metal arc welding is known as Metal Inert Gas (MIG) welding, when the shielding gas is inert, known as Metal Active Gas (MAG) welding when the shielding gas contains reactive gases, such as $O_2$ or $CO_2$ or mixtures of inert and reactive gases. Other high efficiency welding processes, with higher contamination levels, which are commonly used for such welding include submerged arc welding, shielded arc welding, flux cored arc welding and electo-slag welding. Shielding of the arc and molten weld pool is obtained either by an externally supplied gas, which may be inert, reactive or a mixture of inert and reactive gases, or by use of a suitable flux material, which also may contain contaminating materials. It is found that inert gases yield the highest quality weldments, while mixtures of inert and reactive gases produce better weldments than reactive gases alone. These processes have the advantages of being relatively fast and inexpensive. Unfortunately, as service requirements become increasingly severe, there is increasing demand for use of alloy steels. However, these steels may become embrittled during the welding, as a result of the addition of $CO_2$ or oxygen needed to stabilize the arc. Most shielding gases and flux materials contain contaminents, such as $O_2$, $CO_2$, $H_2$ or compounds containing these substances, which will embrittle the weld. While pure inert gases, such as argon, would not embrittle the weld, efficient metal transfer is not obtained and it is necessary to add at least some reactive gas, such as $CO_2$, to the GMAW gas shield or flux material. Gas tungsten arc welding (GTAW) is a process wherein coalescence of metals is produced by heating them with an arc between a tungsten (nonconsumable) electrode and the work and usually uses inert shielding gases, such as helium or argon. Shielding of the arc and weld zone is obtained by employing a blanket of a high purity inert gas, such as argon, which is fed through the electrode holder. Because it relies on high purity gas shielding, the GTAW process has been found to be effective in joining high strength metals and alloys and produces a joint which is extremely tough and strong. However, this process is considerably slower and less efficient than GMAW and, because of the costs of the inert shielding gas and the tungsten electrodes, GTAW is considerably more expensive than GMAW. For these reasons, GTAW is generally not economically competitive with GMAW for welding heavy gages of metal. Producing modern submarines requires welding of heavy gages of high strength metal alloys, which means either employing GTAW to produce a weld of maximum strength, at the sacrifice of time and cost, or to use GMAW to save time and money but produce a joint having reduced strength. It has also been known to overlay a welded joint with a layer of low heat transfer weld to provide a cosmetic finish. However, when this is done, the cosmetic overlay is usually a very thin layer which is applied only for appearance and is not applied continuously along the entire weld joint nor is it intended to provide structural advantages. Thus, none of the prior art welding techniques have been entirely satisfactory.

BRIEF SUMMARY AND OBJECTS OF INVENTION

These disadvantages of prior art welding techniques are overcome with the present invention and an improved method and apparatus for welding are provided which permit heavy gages of high strength low alloy (HSLA) steels to be joined relatively quickly and inexpensively, while producing joints which are extremely strong and durable. Because of these economic considerations, GTAW is not permissible in the specifications MIL-E-23765/2D (Aug. 18, 1987), AM.1 (Oct. 23, 1990) and MIL-E-24355B (Apr. 16, 1991), which apply to steels with yield strengths between 100 and 140 KSI. As a result, the welds in submarine hulls can be defective, although they may or may not meet Navy specifications. This came to light and was reported in Aerospace Daily on Aug. 7, 1991, pages 202–203. In accordance with the present invention, this condition could have been prevented by applying a GTAW layer on the outer surfaces of the weld which is thick enough to prevent fracture initiation. To accomplish such protection, the GTAW layer must be utilized at areas of highest stress concentrations. The process of the present invention is differentiated from cosmetic welding, which is used as an afterthought to repair metal process irregularities; whereas the present process is designed into the welding program and is intentionally used for structural purposes, such as increasing toughness. Generally, with the welding process of the present invention, the GTAW layer will occupy at least about 8% of the total weld thickness.

The advantages of the present invention are preferably attained by providing an improved method and apparatus for welding heavy gages of HSLA steel alloys by creating a joint having a layer of GMAW welding sandwiched between surface layers of GTAW welding. The surface layers of GTAW prevent the initiation of cracks which start on the surface, in accordance with the latest science of fracture mechanics, thus, producing a joint of high fracture toughness.

My invention is not limited to GTAW. There are other welding processes that require high purity inert shielding gas, such as argon. Typical of these other processes are plasma welding, hot wire GTAW, modified laser and modified GMAW process, requiring an adjustable single-phase power supply, using a wire of consumable electrode, which is referred to as "pinch arc" or "pure arc" welding, as described, respectively, in U.S. Pat. No. 3,211,953 by W. Gibson et al and U.S. Pat. No. 3,268,842 by W. Gibson et al. While the present invention is not claiming the "pinch" welding arc, per se, this process will produce a high purity, low oxygen, low penetration deposit, thus effecting additional economy of the present invention. An essential feature of the present invention is to obtain a fracture resistant, low cost welded joint by means of a high purity overlay layer, made keeping the level of reactive gases, such as $O_2$ low, as this element can be intentionally added to the shielding gas. There are other ingredients that downgrade the weld, such as moisture, hydrogen in excess of about 5 parts per million and sulfur or other tramp elements. It has further been established, in substantiation of the present invention, that an overlay made with a shielding gas of a purity level in the range of 100 parts per million to 50 parts per billion, preferably in conjunction with a high purity filler wire, to minimize introduction of hydrogen as a result of moisture and $H_2$ compounds contained in low purity filler wires, further increases fracture resistance with only a nominal increase in cost.

Accordingly, it is an object of the present invention to provide an improved method and apparatus for welding.

Another object of the present invention is to provide an improved method and apparatus for welding high strength metals and alloys.

An additional object of the present invention is to provide an improved method and apparatus for welding heavy gages of HSLA steels.

A further object of the present invention is to provide an improved method and apparatus for welding heavy gages of HSLA steels relatively quickly and inexpensively, while producing joints which are extremely strong and durable and have high fracture toughness.

A specific object of the present invention is to provide an improved method and apparatus for welding heavy gages of high strength metals and alloys by creating a joint having a layer of GMAW welding sandwiched between surface layers of GTAW welding.

These and other objects and features of the present invention will be apparent from the following detailed description, taken with reference to the figures of the accompanying drawings.

DETAILED DESCRIPTION OF THE INVENTION

Figure 1:
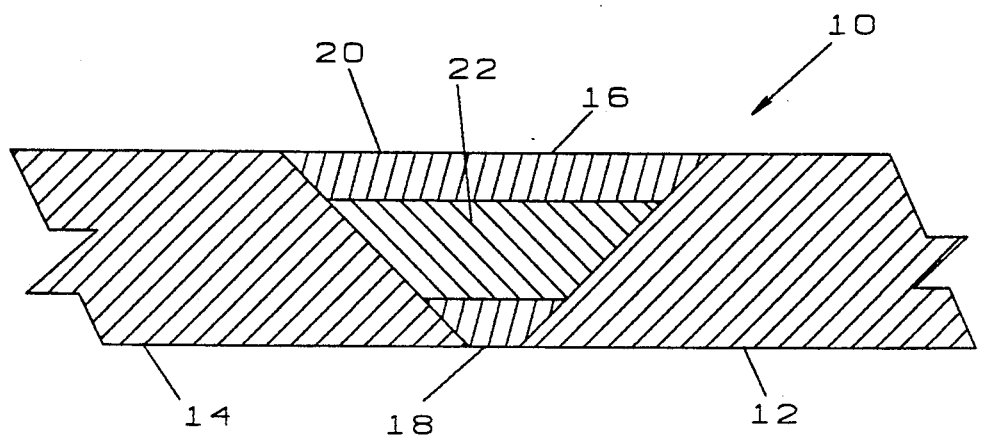
FIG. 1 is a vertical section through a joint welded using the method of the present invention.

In that form of the present invention chosen for purposes of illustration in the drawing, FIG. 1 shows a joint, indicated generally at 10, comprising a pair of metal plates 12 and 14 joined by a weld 16. As shown, the weld 16 is a sandwich-like structure, having a lower layer 18 and an upper layer 20 deposited by a low heat transfer, high purity welding process, such as gas tungsten arc welding (GTAW), using pure Argon as a shielding gas, with a central core 22 deposited by a high heat transfer, low energy density welding process, such as gas metal arc welding (GMAW), using HY 100–140 welding consumables in the spray mode with a shielding gas composed of Argon, having a contamination level in the range of 100 parts per million to 50 parts per billion, and 5–8% $CO_2$ or 2–5% of $O_2$.

As discussed above, recent efforts by the world's navies have sought to build submarines which can withstand the severe pressures of submerging deeper than any previous submarines and which can survive depth charge attacks at these extreme depths and pressures. Accordingly, it has become customary to study the survivability of welded joints after subjecting them to explosive testing. A frequent failure mode produced by explosive testing is the production of surface crack which propagates until failure occurs. Unfortunately, weld produced entirely by GMAW are not strong enough to survive such testing, while welds produces entirely by GTAW are prohibitively time-consuming and expensive. However, using the "sandwich" weld technique of the present invention, GTAW produces outer layers 18 and 20, which are extremely strong and durable, but are expensive and time-consuming to produce; while GMAW produces the central core 22 relatively quickly and inexpensively. The central core 22 is less strong and durable than the GTAW welded outer layers 18 and 20. However, the GTAW outer layers 18 and 20 serve to protect the central core 22 against the effects of explosive and impact loading. Thus, by producing a sandwich-type weld having outer layers 18 and 20 of GTAW welding with a central core 22 of GMAW welding, it is possible to obtain a weld 16 in much less time and at much less cost than a full GTAW weld, yet to produce a joint 10 which is much stronger and more durable than a full GMAW weld. The thickness of the GTAW layers 18 and 20 and the thickness of the GMAW layer 22 may be varied, substantially as desired, to balance the cost and time required to form the weld 16 with the strength and durability provided by the GTAW layers 18 and 20, but should never be less than about 8% of the total weld thickness.

Figure 2:
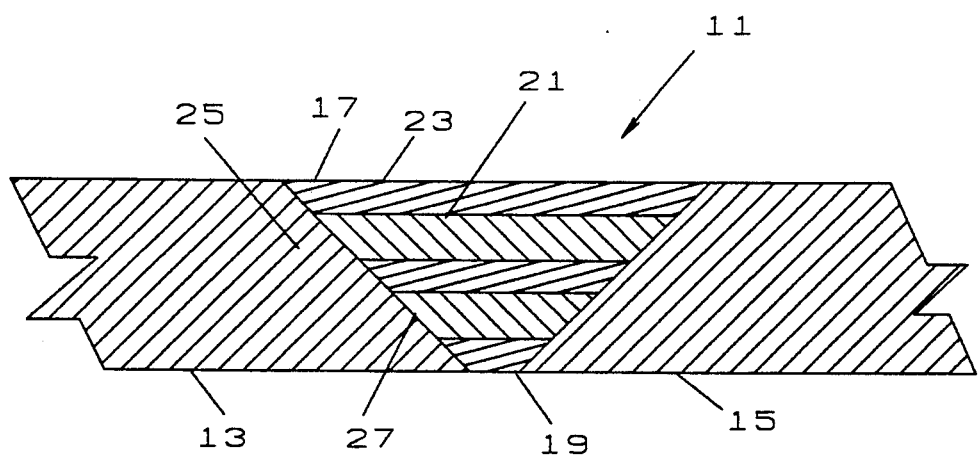
FIG. 2 is a vertical section through an alternative form of joint welded using the method of the present invention.

FIG. 2 shows a joint, indicated generally at 11, comprising a pair of metal plates 13 and 15 joined by a weld 17. As shown, the weld 17 is a sandwich-like structure, having a plurality of alternate crack-arresting layers 19, 21 and 23, formed using a low oxygen welding technique, interposed with a plurality of layers 25 and 27, formed by welding techniques using conventional levels of oxygen.

Figure 3:
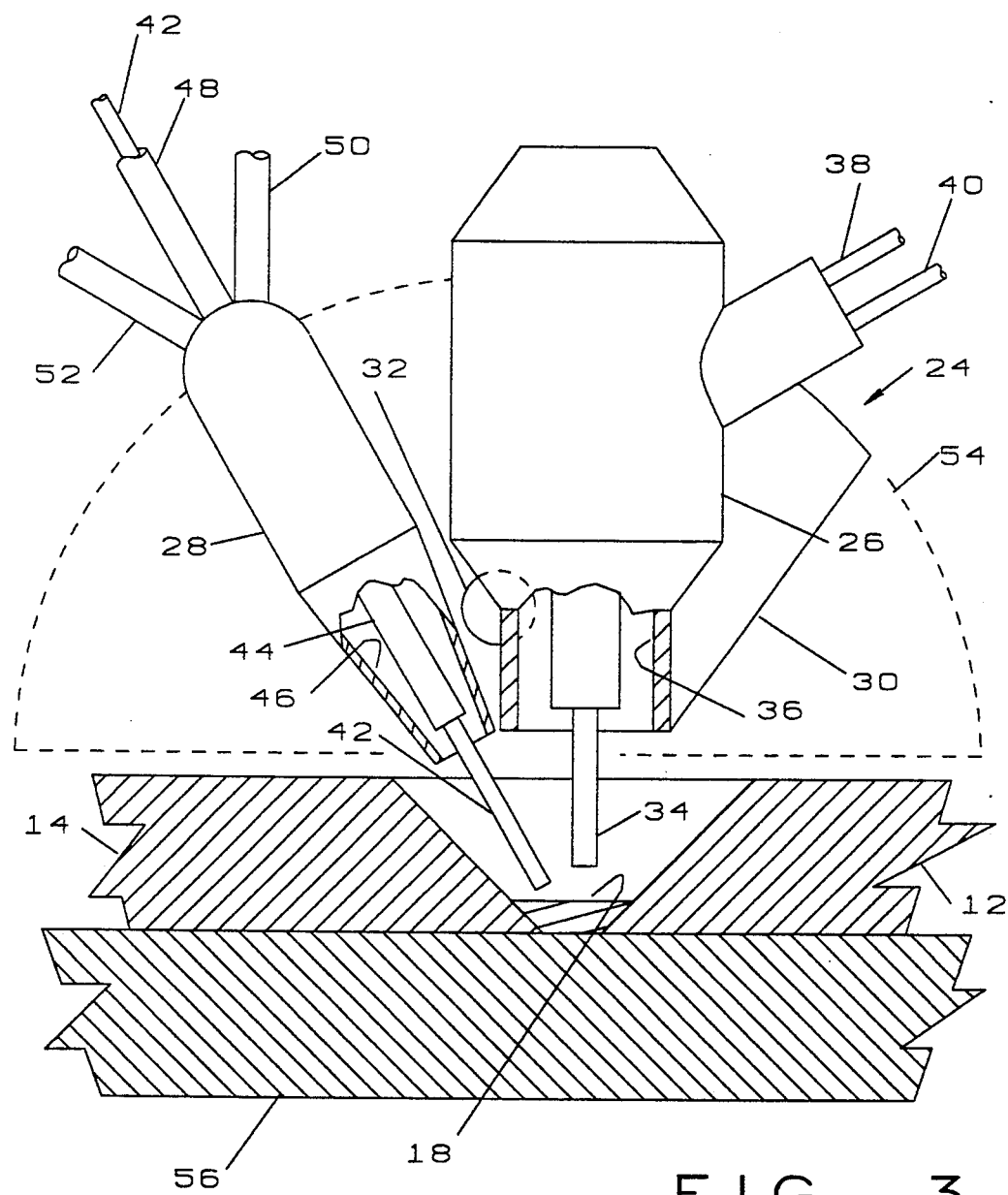
FIG. 3 is a diagrammatic representation of welding apparatus embodying the present invention.

FIG. 3 shows a preferred form of welding device, indicated generally at 24, to permit a fast switch-over for producing the sandwich-type weld 16 of FIG. 1 and weld 17 of FIG. 2. As shown, the welding apparatus 24 comprises a GTAW welding head 26 and a GMAW welding head 28 both mounted on a rotatable plate 30, which is a disk having an arcuate surface of approximately 145° mounted for rotation about a suitable pivot 32 which projects forwardly from a suitable base, not shown. The GTAW welding head 26 has a non-consumable tungsten electrode 34 which is surrounded by a first sleeve 36 projecting downward from the GTAW welding head 26. Electrical current is supplied to the electrode 34 by a suitable conductor 38 and pure Argon gas is supplied to the sleeve 36 by a suitable conduit 40. The GMAW welding head 28 is mounted on the plate 30 at an angle of approximately 45° with respect to the GTAW welding head 28 and comprises a consumable welding rod 42 which projects downwardly from a suitable contact tube 44 surrounded by a second sleeve 46 which projects downwardly from the GMAW welding head 28. As the welding rod 42 is consumed, it is renewed, through channel 48, from a suitable source, not shown, in a conventional manner. Electrical current is supplied to the welding rod 42, which serves as an electrode, by a suitable conductor 50, while a suitable shielding gas is supplied to the second sleeve 46 through conduit 52. With the rotatable plate 30 in the position show in solid lines in FIG. 3, the welding device 24 is prepared for performing GTAW welding operations. When it is desired to perform GMAW welding, the rotating plate is moved to the position shown in dotted lines at 54 in FIG. 3, and is prepared for performing GMAW welding operations, supported by a backing plate 56. A rotatable plate 30 is mounted, by pivot 32, on a work table, not shown, which supports the workpiece plates 12 and 14, while the welding device 24 creates the lower GTAW layer 18 of the joint 10 of FIG. 1.

To perform the GTAW operations, the rotatable plate 30 of the welding device 24 is placed in the position, shown in solid lines in FIG. 3, with the GTAW welding head 26 extending vertically above the work station containing the joint 10 and the GMAW welding head 28 extending at an angle of approximately 45° to the work station. Electrical current is supplied through conductor 38 to the non-consumable tungsten electrode 34 and pure Argon is supplied through conduit 40 and first shield 36 to surround the welding operation. As needed, the welding rod 42 can be fed through channel 48 in a conventional manner. When the lower GTAW layer 18 is complete, the rotatable plate 30 is moved to the position, shown in dotted lines at 54 in FIG. 3, wherein the GMAW welding head 28 extends vertically above the work station containing the joint 10 and the GTAW welding head 26 extends at an angle of approximately 45° to the work station. Electrical current is now supplied through conductor 50 to the welding rod 42, while the current through conductor 40 to the tungsten electrode 34 is discontinued. Similarly, the flow of pure Argon gas through conduit 38 is discontinued and a suitable shielding gas is now supplied through conduit 52 to surround welding rod 42 and the joint 10. The operator may now proceed to create the GMAW layer 22 of the joint 10 of FIG. 1 or weld layer 27 of FIG. 2. When the GMAW layer 22 is completed, the operator again moves the rotatable plate 30 to the solid line position, shown in FIG. 3, discontinues the flow of electrical current through conductor 50 to the welding rod 42 and the flow of shielding gas through conduit 52 to the second sleeve 46 and renews the flow of electrical current through conducted 40 to the tungsten electrode 34 and the flow of pure Argon gas through conduit 38 to the first sleeve 36. The operator may then proceed to create the upper GTAW layer 20 to complete the weld 16 of the joint 10 of FIG. 1 or weld layers 19, 21 or 23 of FIG. 2. It will be seen that the welding device 24 of FIG. 3 permits rapid relocation of the welding heads 26 and 28 and does not require purging of the shielding gas line in switching between the GTAW and GMAW operations. Thus, a minimum amount of time is required to switch between the two welding modes which allows the sandwich-type weld 16 to be created with greatly reduced time and cost.

Obviously, numerous variations and modifications can be made without departing from the spirit of the present invention. Accordingly, it should be clearly understood that the forms of the present invention described above and shown in the figures of the accompanying drawings are illustrative only and are not intended to limit the scope of the present invention.

What is claimed is:

1. A method of welding comprising the steps of:
creating a weld core within a joint using a high deposition, but contaminating welding process, and
overlaying said weld core with an outer weld layer from a low heat transfer, low deposition, high purity welding process continuous along the entire welded joint to improve the structural properties of the joint.

2. A method of claim 1 further comprising:
creating said outer weld layer adjacent one edge of said joint using a high efficiency but contaminating welding process,
creating at least one weld layer within said joint using a low heat transfer, high purity welding process, and
creating at least one additional weld layer using using said high efficiency but contaminating welding process.

3. The method of claim 1 wherein:
said low heat transfer, high purity welding process is performed with Argon having a contamination level in the range of 100 parts per million to 50 parts per billion as a shielding gas.

4. The method of claim 1 wherein:
said high heat transfer but contaminating welding process is performed with a shielding gas containing approximately 92–98% Argon, approximately 5–8% $CO_2$, and 2–5% $O_2$.

5. The method of claim 4 wherein:
said shielding gas contains less than about 5% $O_2$.

6. The method of claim 1 wherein:
said low heat transfer, high purity welding process is gas tungsten arc welding.

7. The method of claim 1 wherein:
said low heat transfer, high purity welding process is plasma arc welding.

8. The method of claim 1 wherein:
said low heat transfer, high purity welding process is a pure arc gas metal arc welding process.

9. The method of claim 1 wherein:
said low heat transfer, high purity welding process is a pinch arc gas metal arc welding process.

10. The method of claim 1 wherein:
said low heat transfer, high purity welding process is obtained using a high purity shielding gas in conjunction with a high purity filler wire.

11. The method of claim 10 wherein:
said filler wire contains less than 5 ppm of $H_2$ or hydrogen-containing compounds.

12. The welding process of claim 1 wherein:
said low heat transfer, high purity welding process occupies at least about 8% of the total weld area.

13. A welded joint comprising:
a pair of members to be welded positioned in abutting relation with at least one of said members having an upper edge and a lower edge adjacent the other of said members,
a first outer weld layer deposited by a high purity gas tungsten arc welding process joining said members adjacent said lower edge of said one of said members,
a second outer weld layer created by gas tungsten arc welding joining said members adjacent said upper edge of said one of said members, and
a central core deposited by a contaminating gas metal arc welding joining said members between said outer weld layers.

14. A welding device comprising:
a rotatable plate movable about a pivot between a first position and a second position,
a gas tungsten arc welding head mounted on said rotatable plate and extending substantially vertically from a work station when said rotatable plate is in said first position and extending at approximately 45° to said work station when said rotatable plate is in said second position,
a gas metal arc welding head mounted on said rotatable plate and extending approximately 45° degrees to said work station when said rotatable plate is in said first position and extending substantially vertically from said work station when said rotatable plate is in said second position.

15. The welding device of claim 14 wherein:
said gas tungsten arc welding head contains a tungsten electrode surrounded by a first sleeve,
means for supplying electrical current to said electrode, and
means for supplying a pure inert gas to said first sleeve.

16. The welding device of claim 14 wherein:
said gas metal arc welding head contains a welding rod and a second sleeve surrounding said rod,
means for supplying electrical current to said welding rod, and
means for supplying a shielding gas to said second sleeve.

17. The welding device of claim 14 wherein:
said welding rod has a rating in the range of HY 100-140.

18. The welding device of claim 14 wherein:
said welding rod contains less than 5% of $H_2$ or hydrogen-containing compounds.

19. The welding device of claim 14 wherein:
said shielding gas contains Argon having a purity level in the range of 100 parts per million to 50 parts per billion.

* * * * *